UNITED STATES PATENT OFFICE 2,051,218

INHIBITOR FOR PICKLING OF METALS

George L. Magoun and Deal H. Tompkins, Nitro, W. Va., assignors, by mesne assignments, to Monsanto Chemical Company, Wilmington, Del., a corporation of Delaware No Drawing. Original application November 6, 1930, Serial No. 493,907. Divided and this application March 16, 1931, Serial No. 523,188

12 Claims. (Cl. 260—3)

The present invention relates to a new class of compounds comprising acid derivatives of a reaction product of a thiourea and an aldehyde-ammonia. The preferred class of compounds possess valuable inhibiting qualities when employed in the acid pickling of metals. The invention also comprises the process of manufacturing such products.

One of the preferred class of compounds, for example a sulfuric acid derivative of a reaction product of thiocarbanilide and acetaldehyde-ammonia, was prepared as follows: Substantially two molecular proportions of acetaldehyde were dissolved in an organic solvent, for example, a quantity of ethyl alcohol equal to approximately three times the weight of the acetaldehyde. Ammonia, preferably in the anhydrous condition, was passed thereinto until substantially two molecular proportions of the gas were absorbed, as indicated by the increase in weight, while agitating and maintaining a temperature preferably below substantially 25° C. To the product thus formed substantially one molecular proportion of thiocarbanilide was added and the mixture heated to and maintained at a refluxing temperature while agitating, until the reaction was complete. The solvent employed, for example ethyl alcohol, was then removed preferably by distillation. The residual product thus formed, comprising a thick viscous resin, was then treated with substantially one molecular proportion of sulfuric acid, preferably in the form of approximately 93 per cent acid, and the product thus formed heated in a convenient manner preferably at a temperature of substantially 100 to 110° C. for a period of approximately 24 hours. The final product thus formed was a hard, brittle resin.

Other acid derivatives of a reaction product of a thiourea and an aldehyde-ammonia have been prepared in a manner analogous to that hereinbefore set forth. Thus, the following products were so prepared:

Compound A.—The sulfuric acid derivative of the reaction product of substantially one molecular proportion of thiocarbanilide and substantially two molecular proportions of butyraldehyde-ammonia.

Compound B.—The sulfuric acid derivative of the reaction product of substantially one molecular proportion of thiomarbanilide and substantially two molecular proportions of crotonaldehyde-ammonia.

Compound C.—The sulfuric acid derivative of the reaction product of substantially one molecular proportion of thiocarbanilide and substantially two molecular proportions of heptaldehyde-ammonia.

Compound D.—The sulfuric acid derivative of the reaction product of substantially one molecular proportion of thiocarbanilide and substantially two molecular proportions of formaldehyde-ammonia.

Compound E.—The sulfuric acid derivative of the reaction product of substantially one molecular proportion of thiocarbanilide and substantially two molecular proportions of alpha-ethyl-beta-propylacrolein-ammonia.

Compound F.—The sulfuric acid derivative of the reaction product of substantially one molecular proportion of thiourea and substantially two molecular proportions of acetaldehyde-ammonia.

Compound G.—The sulfuric acid derivative of the reaction product of substantially one molecular proportion of di-ortho-tolyl-thiourea and substantially two molecular proportions of acetaldehyde-ammonia.

Compound H.—The sulfuric acid derivative of the reaction product of substantially one molecular proportion of phenyl-ortho-tolyl-thiourea and substantially two molecular proportions of acetaldehyde-ammonia.

Compound I.—The sulfuric acid derivative of the reaction product of substantially one molecular proportion of mono-phenyl-thiourea and substantially two molecular proportions of acetaldehyde-ammonia.

Compound J.—The sulfuric acid derivative of the reaction product of substantially one molecular proportion of phenyl-piperidyl-thiourea and substantially two molecular proportions of acetaldehyde-ammonia.

Compound K.—The sulfuric acid derivative of the reaction product of substantially one molecular proportion of phenyl-alpha-naphthyl-thiourea and substantially two molecular proportions of acetaldehyde-ammonia.

Compound L.—The hydrochloric acid derivative of the reaction product of substantially one molecular proportion of thiocarbanilide and substantially two molecular proportions of acetaldehyde-ammonia.

Compound M.—The phosphoric acid derivative of the reaction product of substantially one molecular proportion of thiocarbanilide and substantially two molecular proportions of acetaldehyde-ammonia.

Compound N.—The acetic acid derivative of the reaction product of substantially one molecular proportion of thiocarbanilide and substantially two molecular proportions of acetaldehyde-ammonia.

*Compound O.*—The oxalic acid derivative of the reaction product of substantially one molecular proportion of thiocarbanilide and substantially two molecular proportions of acetaldehyde-ammonia.

It has further been found that other ratios of acid, thiourea and aldehyde-ammonia than those hereinbefore set forth may be reacted. Thus, approximately one molecular proportion of the reaction product of substantially one molecular proportion of thiocarbanilide and substantially two molecular proportions of acetaldehyde-ammonia has been reacted with substantially one and two-thirds molecular proportions of sulfuric acid to form a compound of the preferred class.

The present application is a division of our co-pending U. S. patent application, Serial No. 493,907, which on Aug. 4, 1931, matured into U. S. Patent No. 1,816,860.

What is claimed is:

1. As a chemical compound the resinified product formed by reacting substantially one molecular proportion of thiocarbanilide with substantially two molecular proportions of acetaldehyde-ammonia and further resinifying the product thus formed by reacting therewith substantially one molecular proportion of concentrated sulfuric acid.

2. A composition of matter consisting in a resin produced by reacting a diaryl substituted thiourea and an aliphatic aldehyde-ammonia in the absence of a catalyst and in the presence of an organic solvent at a refluxing temperature, removing said solvent, and resinifying the residual reaction product by reacting therewith less than the theoretical amount of concentrated strong acid required for the reaction with the entire basic constituents thereof and thereafter heating at a temperature above substantially 100° C.

3. A composition of matter consisting in a hard brittle product produced by reacting a diaryl substituted thiourea and an aliphatic aldehyde-ammonia in the absence of a catalyst and in the presence of an organic solvent at a refluxing temperature, removing said solvent, and resinifying the residual reaction product by reacting therewith less than the theoretical amount of concentrated sulfuric acid required for the reaction with the entire basic constituents thereof and thereafter heating at a temperature of substantially 100 to 110° C.

4. A composition of matter consisting in a hard brittle product produced by reacting thiocarbanilide and acetaldehyde-ammonia in the absence of a catalyst and in the presence of an organic solvent at a refluxing temperature, removing said solvent, and resinifying the residual reaction product by reacting therewith less than the theoretical amount of concentrated sulfuric acid required for the reaction with the entire basic constituents thereof and thereafter heating at a temperature of substantially 100 to 110° C.

5. The process of preparing the product formed by reacting substantially one molecular proportion of thiocarbanilide with substantially two molecular proportions of acetaldehyde ammonia and further reacting the product thus formed with substantially one molecular proportion of sulfuric acid, which consists in reacting said thiocarbanilide with said acetaldehyde ammonia in the absence of a catalyst and in the presence of an organic solvent at a refluxing temperature removing said solvent and resinifying the product thus formed by reacting with concentrated sulfuric acid and thereafter heating at a temperature of substantially 100 to 110° C.

6. A resinous solid consisting in a product produced by reacting an aryl substituted thiourea and an aliphatic aldehyde-ammonia and resinifying the reaction product so obtained by reacting therewith a concentrated acid in amount insufficient to react with the entire basic constituents thereof, and thereafter heating at a temperature above substantially 100° C.

7. A resinous solid consisting in a product produced by reacting a diaryl substituted thiourea and an aliphatic aldehyde-ammonia and resinifying the reaction product so obtained by reacting therewith a concentrated strong acid in amount insufficient to react with the entire basic constituents thereof, and thereafter heating at a temperature above room temperature but below substantially 110° C.

8. A resinous solid consisting in a product produced by reacting a diaryl substituted thiourea and an aliphatic aldehyde-ammonia and resinifying the reaction product so obtained by reacting therewith concentrated sulfuric acid in amount insufficient to react with the entire basic constituents thereof, and thereafter heating at a temperature above room temperature but below substantially 110° C.

9. The process of preparing a resinous solid which consists in reacting an aryl substituted thiourea and an aliphatic aldehyde-ammonia and resinifying the reaction product so obtained by reacting therewith a concentrated acid in amount insufficient to react with the entire basic constituents thereof, and heating at a temperature above substantially 100° C.

10. The process of preparing a resinous solid which consists in reacting a diaryl substituted thiourea and an aliphatic aldehyde-ammonia and resinifying the reaction product so obtained by reacting therewith a concentrated strong acid in amount insufficient to react with the entire basic constituents thereof, and heating at a temperature above room temperature but below substantially 110° C.

11. The process of preparing a resinous solid which consists in reacting a diaryl substituted thiourea and an aliphatic aldehyde-ammonia and resinifying said reaction product by reacting therewith concentrated sulfuric acid in amount insufficient to react with the entire basic constituents thereof, and heating at a temperature above room temperature but below substantially 110° C.

12. The process of preparing a resinous solid which consists in reacting thiocarbanilide and acetaldehyde-ammonia and resinifying the reaction product so obtained by reacting therewith concentrated sulfuric acid in amount insufficient to react with the entire basic constituents thereof, and heating at a temperature above room temperature but below substantially 110° C.

GEORGE L. MAGOUN.
DEAL H. TOMPKINS.